(12) United States Patent
Krauer

(10) Patent No.: US 9,225,197 B2
(45) Date of Patent: Dec. 29, 2015

(54) CHARGING EFFICIENCY USING VARIABLE ISOLATION

(75) Inventor: Jean-Pierre Krauer, San Jose, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 1066 days.

(21) Appl. No.: 13/102,893

(22) Filed: May 6, 2011

(65) Prior Publication Data

US 2012/0280662 A1   Nov. 8, 2012

(51) Int. Cl.
*H02J 7/00* (2006.01)
*H02J 7/04* (2006.01)

(52) U.S. Cl.
CPC ................. *H02J 7/04* (2013.01); *H02J 7/0055* (2013.01); *Y02B 40/90* (2013.01)

(58) Field of Classification Search
CPC combination set(s) only.
See application file for complete search history.

(56) References Cited

U.S. PATENT DOCUMENTS

| | | | |
|---|---|---|---|
| 5,940,280 A | 8/1999 | Murai et al. | |
| 8,080,973 B2 * | 12/2011 | King et al. | 320/104 |
| 8,462,528 B2 * | 6/2013 | Kajouke et al. | 363/127 |
| 8,599,577 B2 * | 12/2013 | Kajouke et al. | 363/8 |
| 2009/0140698 A1 | 6/2009 | Eberhard et al. | |
| 2009/0140700 A1 | 6/2009 | Eberhard et al. | |
| 2009/0143929 A1 | 6/2009 | Eberhard et al. | |
| 2009/0167254 A1 | 7/2009 | Eberhard et al. | |
| 2009/0212745 A1 | 8/2009 | Kelty et al. | |
| 2009/0216688 A1 | 8/2009 | Kelty et al. | |
| 2010/0222953 A1 | 9/2010 | Tang | |
| 2011/0012562 A1 | 1/2011 | Paryani | |
| 2011/0031927 A1 * | 2/2011 | Kajouke et al. | 320/108 |
| 2011/0077879 A1 | 3/2011 | Paryani | |
| 2012/0019194 A1 * | 1/2012 | Krauer et al. | 320/107 |
| 2012/0019212 A1 | 1/2012 | Krauer | |
| 2012/0112702 A1 * | 5/2012 | Steigerwald et al. | 320/137 |

OTHER PUBLICATIONS

Cox, N.R., "A Universal Power Converter for Emergency Charging of Electric Vehicle Batteries," Applied Power Electronics Conference and Exposition, 1995, APEC '95, Conference Proceedings 1995, Tenth Annual Dallas, Texas, USA, Mar. 5-9, 1995, New York, NY, USA, IEEE, US, Mar. 5, 1995, pp. 965-969.

* cited by examiner

*Primary Examiner* — Drew A Dunn
*Assistant Examiner* — Steve T Chung
(74) *Attorney, Agent, or Firm* — J. Richard Soderberg

(57) ABSTRACT

A method for charging an energy storage system (ESS) from an AC line voltage having differing input voltages (e.g., 120 Vac or 240 Vac), the method includes a) determining which of the AC line voltages is provided for charging the ESS as a charging AC voltage; b) boosting the charging AC voltage to an intermediate voltage responsive to the provided AC line voltage; c) scaling, responsive to the particular one of the AC line voltages, the intermediate voltage to a secondary voltage using a scaling factor; and d) converting the secondary voltage to a charging voltage applied to the ESS.

11 Claims, 4 Drawing Sheets

CHARGING EFFICIENCY USING VARIABLE ISOLATION

BACKGROUND OF THE INVENTION

The present invention relates generally to chargers for energy storage systems, and more specifically, but not exclusively, to improvements in universal input charger efficiency.

Chargers for plug-in electric vehicles convert AC input voltage to an appropriate DC charging voltage applied to the energy storage system. Efficiencies in the charging process are particularly important because of the relatively large amounts of energy transferred and stored during the frequent charging cycles. Those responsible for charging systems and methods are always looking for ways to improve charging efficiency, especially when efficiency improvements may be realized simply without significantly adding to weight, volume, or cost budgets which are all tightly controlled for electric vehicles.

One fundamental charger design includes two stages, a boost stage and an isolation stage. The boost stage provides a power factor correction front end that is required of all commercial charging systems for electric vehicles. The isolation stage provides increased safety by isolating the AC line from the energy storage system. Further, the isolation stage reduces common mode currents in the charger. There is a buck component that allows the energy storage system to be at a much lower voltage than the boost output stage. For example, assume that the efficiency of the boost stage is around M % and the efficiency of the isolation stage is around N %, there is a total efficiency of P %, where P is less than both M and N because M and N are each less than 1.

Further compounding inefficiencies in such systems is that the AC input voltage can vary from one charging installation to another. A manufacturer would desirably provide a single charger design adapted for universal installation. Such an installation would, at a minimum, permit charging for reasonably anticipated input voltage ranges (e.g., 120 Vac and 240 Vac for the United States).

The boost stage of such a universal charger increases the input voltage to an intermediate voltage. This intermediate voltage (for example ~400 Vdc) is above the highest input line voltage that is expected to be present (i.e., 240 Vac) during charging. A problem addressed by the present invention is that there are different charging efficiencies when charging to a fixed intermediate voltage depending on the actual input line voltage. That is, when boosting 120 Vac to 400 Vdc, the overall efficiency (e.g., ~85%) will often be significantly less than the overall efficiency (~93%) when boosting 240 Vac to 400 Vdc.

What is needed is an improved charger and charging method that improves overall charging efficiency associated with varying input line voltage.

BRIEF SUMMARY OF THE INVENTION

Disclosed is an improved charger and charging method that improves charging efficiency associated with varying input line voltage. The following summary of the invention is provided to facilitate an understanding of some of technical features related to improved chargers and charging methods, and is not intended to be a full description of the present invention. A full appreciation of the various aspects of the invention can be gained by taking the entire specification, claims, drawings, and abstract as a whole.

An apparatus for charging an energy storage system (ESS) from an AC line having one of a first AC RMS line voltage and a second AC RMS line voltage greater than the first AC RMS line voltage, includes a boost stage converting the line voltage to an intermediate voltage greater than a peak voltage of the AC RMS line voltage wherein the intermediate voltage is responsive to a boost control signal to set a magnitude of the intermediate voltage wherein the intermediate voltage has one of a first intermediate magnitude and a second intermediate magnitude greater than the first intermediate magnitude; an isolation buck stage both converting the intermediate voltage to a secondary voltage and converting the secondary voltage to a charging voltage applied to the ESS, with the charging voltage greater than a charge voltage of the ESS, the isolation buck stage removing a common mode current between the ESS and the boost stage, the isolation buck stage including a first operational mode and a second operational mode, the operational modes responsive to an isolation control signal wherein the operational modes scale the conversion of the intermediate voltage to the secondary voltage with the first operational mode providing a first scaling of the intermediate voltage different from a second scaling of the second operational mode; and a controller, coupled to the stages and providing the control signals responsive to a magnitude of the AC RMS line voltage, wherein the boost stage produces the first intermediate magnitude from the first AC RMS line voltage and the isolation buck stage is configured for the first operational mode to convert the first intermediate voltage to the secondary voltage and wherein the boost stage produces the second intermediate magnitude from the second AC RMS line voltage and the isolation buck stage is configured for the second operational mode to convert the second intermediate voltage to the secondary voltage.

A method for charging an energy storage system (ESS) from an AC line voltage having one of a first AC RMS line voltage and a second AC RMS line voltage greater than the first AC RMS line voltage, the method includes a) determining which of the AC line voltages are available for charging the ESS as a charging AC voltage; b) boosting the charging AC voltage to an intermediate voltage having a magnitude responsive to a particular one of the AC line voltages determined to be available, the magnitude of the intermediate voltage less when the particular one AC line voltage is the first AC RMS line voltage than when the particular one AC line voltage is the second AC RMS line voltage; c) scaling, responsive to the particular one of the AC line voltages, the intermediate voltage to a secondary voltage using a scaling factor, the scaling factor different when the particular one AC line voltage is the first AC RMS line voltage than when the particular one AC line voltage is the second AC RMS line voltage; and d) converting the secondary voltage to a charging voltage applied to the ESS.

Through the structure and process of the present invention, overall charging efficiency is increased. The present invention recognizes that different input voltages from a charging station (e.g., 120 Vrms or 240 Vrms for typical US supply voltages though other localities may have different ranges) would create different charging efficiencies and therefore a universal charger including an embodiment of the present invention makes internal adjustments to provide improved charging efficiency for all input voltages.

Charging efficiency is always of concern given the relatively large amounts of energy storage in systems like electric vehicles. Many implementations having rechargeable systems set forth strict budgets for size, weight, and cost. Designs which elegantly and simply address several concerns at once are preferred, particularly when an addition of a single relatively inexpensive component improves charging efficiencies across a range of expected input voltages. The benefits are further improved when the solution enables use of lower overall voltages which translates to lower voltage type devices which reduces costs and dissipates less power and requires less cooling, as will be further explained below.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
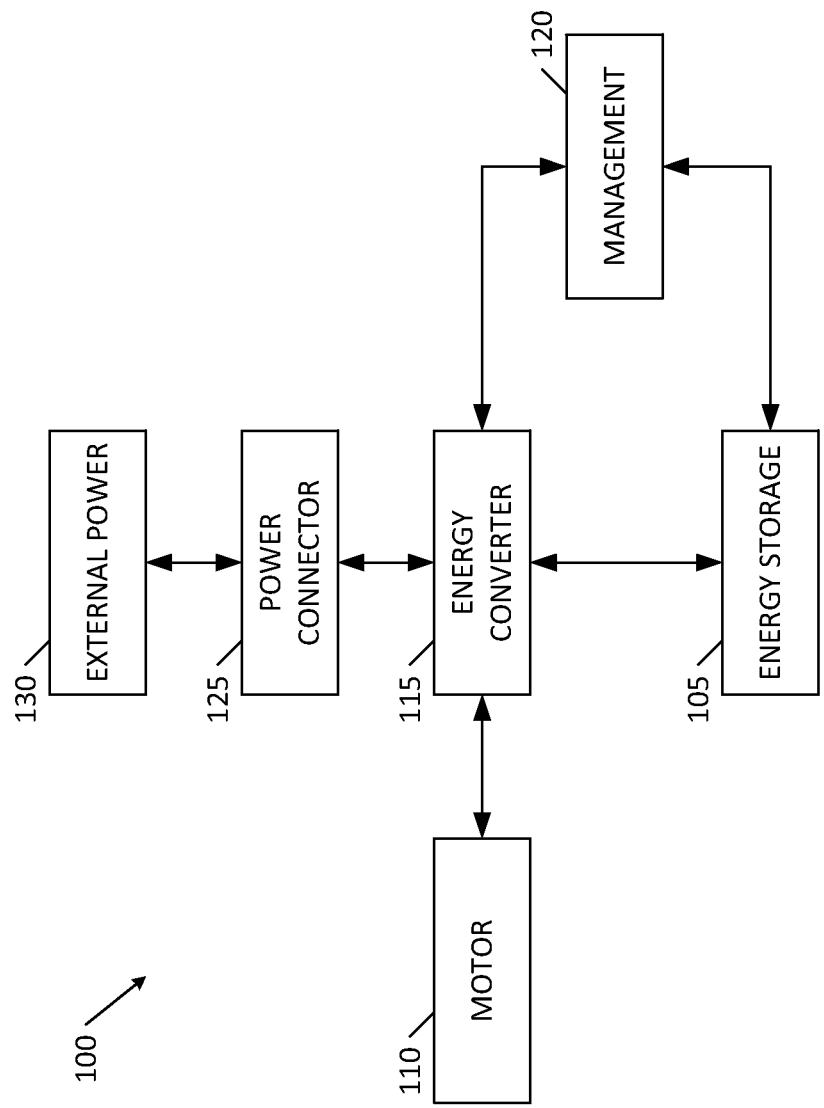
FIG. 1 illustrates a schematic block diagram for a representative electric motor system incorporating a preferred embodiment of the present invention.

Embodiments of the present invention provide an improved charger and charging method that improves charging efficiency. The following description is presented to enable one of ordinary skill in the art to make and use the invention and is provided in the context of a patent application and its requirements. In the following text, the terms "energy storage assembly," "battery," "cell," "battery cell," "battery cell pack," "electrolytic double-layer capacitor," and "ultracapacitor" may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Embodiments of the present invention are applicable to systems that employ electric motors in general, and more specifically (but not exclusively) to vehicles using multiphase electric induction motors. Electric vehicles (EVs) include vehicles that have one or more sources of stored energy designed to provide electrical energy to the vehicle, wherein the electrical energy is used to at least in part to provide some energy used to propel the vehicle. Electric vehicles may include vehicles designed to carry passengers, to transport goods, or to provide specialty work capabilities. For example, electric vehicles include passenger automobiles, trucks, and recreational watercrafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks.

Generally, an electric vehicle includes some form of a device or devices capable of storing energy and that is operable to provide electrical power to the vehicle. The electrical power may be used to at least in part provide energy for propelling the vehicle. In some instances, the electrical power is used to provide the energy required for all of the vehicle's functions, including propulsion. In many instances, the source of the stored energy is a rechargeable battery pack. In various embodiments, a rechargeable battery pack includes a plurality of individual rechargeable battery cells that are electrically coupled to provide a rechargeable battery pack.

FIG. 1 is a schematic block diagram for a representative electric motor system 100 incorporating a preferred embodiment of the present invention. To simplify further discussion, system 100 will be described below in the context of an electric vehicle. However it is understood that system 100 may be part of another device or system other than an electric vehicle. System 100 includes an energy storage system (ESS) 105 that includes a vehicle propulsion battery or the like and at least one propulsion motor 110 for converting energy into mechanical motion, such as rotary motion. ESS 105 includes various components associated with transmitting energy to and from the vehicle propulsion battery in various examples, including safety components, cooling components, heating components, rectifiers, and the like. ESS 105 may be implemented in many different ways and include many different components, but for purposes of this example, ESS 105 includes a propulsion battery, ultracapacitor, or the like. Thus, the present subject matter should not be construed to be limited to the configurations disclosed herein, as other configurations are possible and within the scope of the present invention.

The propulsion battery of ESS 105 of this example includes one or more lithium ion batteries. In some examples, the battery includes a plurality of lithium ion batteries coupled in parallel and/or series. Some examples include cylindrical lithium ion batteries. In some cases, ESS 105 includes one or more batteries compatible with the 18650 battery standard, but the present subject matter is not so limited. Some examples include approximately 2981 batteries which are interconnected. The vehicle propulsion battery used in ESS 105, in some examples, provides approximately 390 volts, though increasingly greater voltages are being implemented.

Additionally system 100 includes an energy converter 115. Energy converter 115 converts energy from ESS 105 into energy useable by motor 110. In some instances, there is energy flow from motor 110 into ESS 105 through energy converter 115. ESS 105 transmits energy to energy converter 115, which converts the transmitted energy into energy usable by motor 110 to propel the electric vehicle. Motor 110 may also generate energy that is transmitted to energy converter 115. In these instances, energy converter 115 converts the transmitted energy from motor 110 into energy which may be stored in ESS 105. As shown below in connection with an exemplary FIG. 4, energy converter 115 includes semiconductor power devices such as transistors. These transistors may include one or more field effect transistors. Some examples include metal oxide semiconductor field effect transistors. Some examples include one or more insulated gate bipolar transistors. As such, in various examples, the energy converter 115 includes switching elements which are configured to receive direct current (DC) power from ESS 105 and to output multiphase (e.g., three-phase) alternating current (AC) to power motor 110. As noted above, it is sometimes the case that energy converter 115 is configured to convert a three-phase output from motor 110 to DC power to be stored in ESS 105. Some configurations of energy converter 115 convert energy from ESS 105 into energy usable by electrical loads other than motor 110. Some of these examples switch energy from approximately 390 Volts of ESS 105 to 14 Volts (DC).

In this example, motor 110 is a three phase AC motor. Sometimes system 100 may include a plurality of such motors. The vehicle optionally includes a transmission, such as a 2-speed transmission, though other examples are possible. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission to the wheels via one or more axles.

A management system 120 is optionally provided which provides control for one or more of ESS 105 and energy converter 115. In some cases, management system 120 is coupled to a vehicle system which monitors safety (such as a crash sensor). In some examples management system 120 is coupled to one or more driver inputs (such as a speed adjuster, colloquially termed a throttle, although the present subject matter is not limited to examples having an actual throttle). Management system 120 is configured to control power to one or more of ESS 105 and energy converter 115.

A power connector 125 accesses an external power source 130, e.g., a charging station, to receive energy and communicate it with ESS 105 through energy converter 115. In some examples, the charging station converts power from a single phase 120V AC (RMS) power source into power storable by ESS 105. In additional examples, the charging station converts power from a 240V AC (RMS) power source into power storable by ESS 105. Some implementations include single-phase line voltages while others employ polyphase line voltages. FIG. 1 illustrates an implementation in which energy converter 115 converts power from energy source 130 to energy storable by ESS 105. System 100 includes an integrated charger and drive inverter, while other embodiments provide a separate charger and drive inverter. Embodiments of the present invention may be used with either configuration.

The exemplary voltages described in the preceding paragraph are generally applicable to North America. Other locations often use different magnitude and frequency for the AC line voltages available for charging. The preferred embodiments of the present invention contemplate a universal charging system that may be employed in virtually any geographic market. Energy converter 115 is adapted to provide efficient charging without regard to variations in the AC line voltages (including variations within any particular system and variations across systems). Energy converter 115 is designed to provide isolation from ESS 105 to external power source 130 which reduces common mode currents and provides increased safety by isolating the AC line from the ESS.

In a typical conventional charger, the boost stage and the isolation-buck stage optimizes the charging efficiency for one particular line input voltage. When a different input line voltage is present, the charging efficiency can fall to unacceptable levels and/or intermediate voltages are greater than necessary which requires higher quality (typically more expensive) components, and more power is dissipated requiring longer charging time and use of more energy for cooling.

Preferred embodiments of the present invention address this situation by adjusting intermediate voltages provided by the boost stage and then using appropriate responsive scaling of the isolation-buck stage of the intermediate voltages to produce the desired secondary voltage. The efficiencies of the boost-stage is increased without degrading the efficiency of the isolation-buck stage leading to an improvement in the overall efficiency for the range of input voltages.

Figure 2:
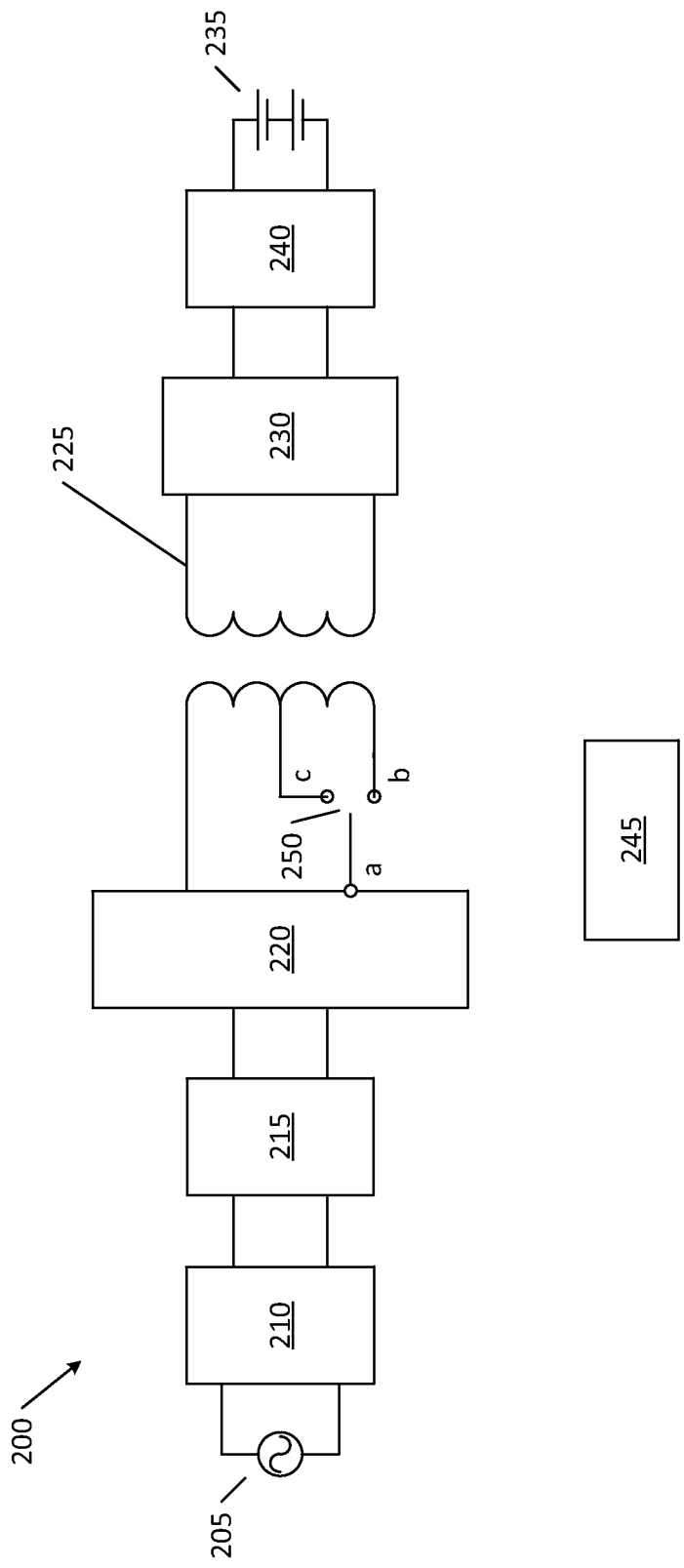
FIG. 2 illustrates a simplified schematic diagram of a charging configuration model for the system including the energy converter shown in FIG. 1.

FIG. 2 illustrates a simplified schematic diagram of a charging configuration model 200 for system 100 including energy converter 115 shown in FIG. 1. (As noted herein, the actual energy converter is very complex and handles many different functions. Model 200 is not provided to be a complete diagram of an entire energy converter, but is shown simplified to better enable the reader to focus on the improvements and details of the present invention relating to an intelligent multi-mode efficient universal charger.) To further simplify FIG. 2, model 200 is shown for a single phase. This could also be a multiphase input AC power into the charger.

Model 200 includes an AC line voltage source 205 providing AC charging voltages at potentially different nominal voltages (e.g., 120 Vrms and 240 Vrms typical for the United States). An electromagnetic interference (EMI) filter 210 and a full wave bridge (FWB) 215 process and condition the AC charging voltage from source 205 and communicate it to a boost stage 220. Boost stage 220 increases ("boosts") the AC charging voltage to an intermediate voltage. An isolation stage, including an isolation transformer 225 and a buck sub-stage 230, receive the intermediate voltage and i) convert the intermediate voltage to a secondary voltage; ii) decrease the secondary voltage to a charging voltage; and iii) isolates the AC line voltage source 205 from an energy storage system (ESS) 235. Preferably a voltage conditioner function 240 is interposed between the boosted/bucked AC charging voltage and ESS 235 to ensure that the charging voltage applied to ESS 235 has the correct format. Operation of the stages, including switches, contactors and the like, is shown controlled by a controller function 245.

Controller function 245 not only sets the appropriate magnitude of the intermediate voltage, it controls a relay 250 (e.g., a single pole double throw relay) of the isolation-buck stage. Relay 250 determines a scaling factor that the isolation-buck stage applies to the intermediate voltage from boost stage 220. In the preferred embodiment, the scaling factor is set by an isolation transformer having a primary winding (with a tap) and a second winding. The primary winding receives the intermediate voltage from boost stage 220 and the secondary winding provides the appropriately scaled secondary voltage based upon a ratio of the effective number of turns of the primary winding to the number of turns of the secondary winding.

Varying this ratio sets the desired value for the variable scaling factor used in the preferred embodiment. Relay 250 selectively applies the intermediate voltage available at node "a" to either the entire primary winding (node "b") or alternatively to a primary winding tap coupled to node "c" to reduce the effective number of turns of the primary winding (which increases the scaling factor).

Figure 3:
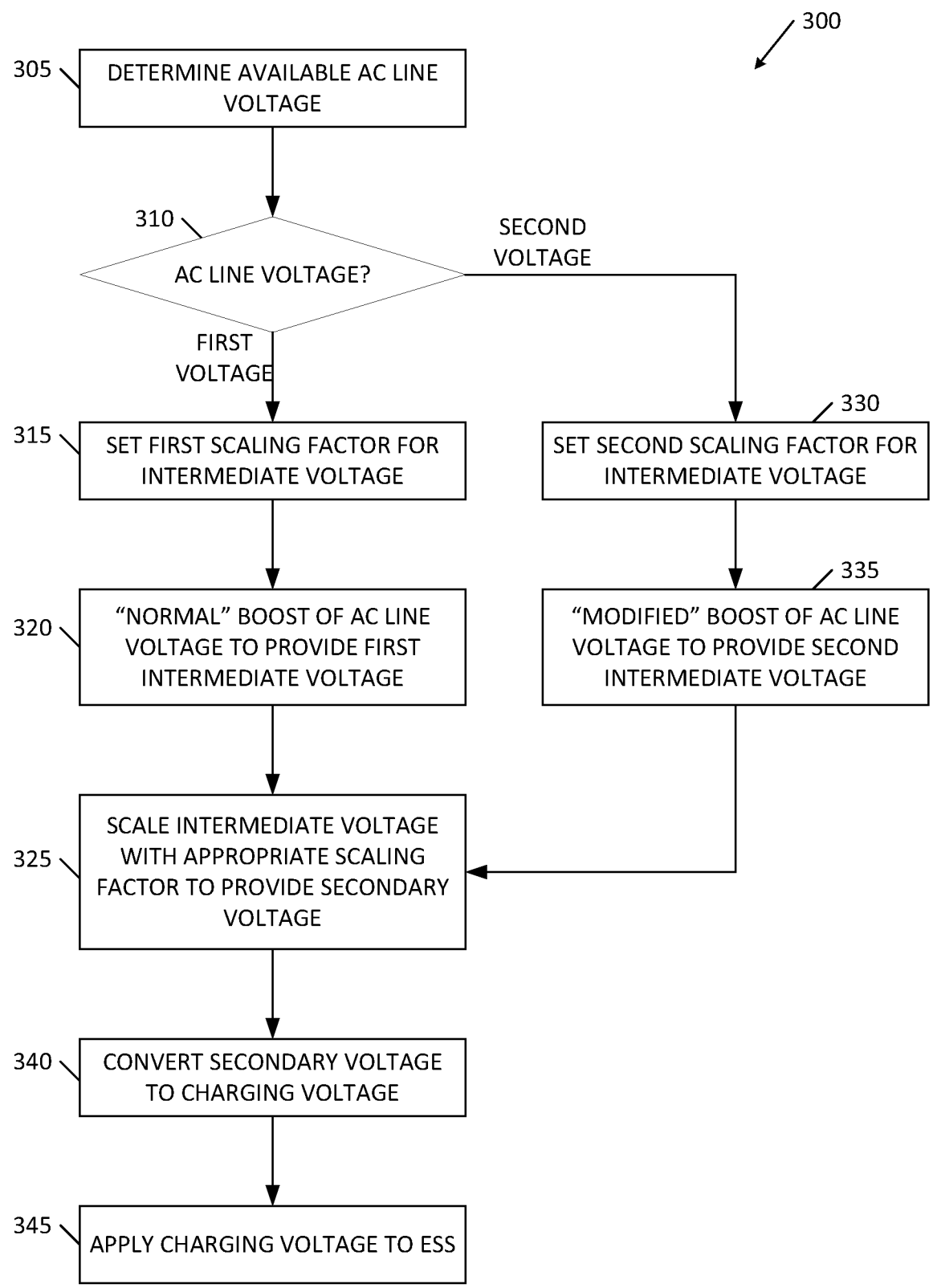
FIG. 3 illustrates a control process for setting the operational mode of the charging model by setting the state of a set of contactors.

As explained in more detail with respect to FIG. 3, controller function 245 determines an available line input voltage and reconfigures the system to improve the charging efficiency based upon the particular available line input voltage and battery voltage. For example, for the 240 Vac input voltage, controller function 245 causes boost stage 220 to boost the 240 Vac to about 400 Vdc, and controller function 245 sets relay 250 to couple node "a" to node "b" which scales the 400 Vdc to about 450 Vdc. However, for the 120 Vac input voltage, controller function 245 causes boost stage 220 to boost the 120 Vac to a value less than 400 Vdc. This reduced intermediate voltage at node "a" is then applied to the tap of the primary winding by changing relay 250 from node "b" to node "c," which scales the reduced intermediate voltage by a greater amount than was the case for the 240 Vac input voltage to achieve a secondary voltage approximately the same.

By reducing the amount of "boost" applied to the 120 Vac, the efficiency of the boost stage is significantly increased. The selective scaling from isolation transformer 225 permits the reduced intermediate voltage for the 120 Vac condition to be increased to the desired voltage level for the secondary voltage without causing over-scaling of the intermediate voltage for the 240 Vac condition. If the scaling factor used for the 120 Vac condition were used for the 240 Vac condition, the secondary voltage would be greater than necessary, requiring higher voltage rated rectifiers and components that result in increased costs in many budget categories.

As mentioned herein, there are many competing factors for implementation of a design feature in an EV system. Any "optimization" includes appreciation of the various competing factors, and optimization is performed with the available variables. In a simple case as shown in FIG. 2, by addition of single pole double throw relay 250 in conjunction with a tap on isolation transformer 225, universal boost converter efficiency is significantly increased for each of two different AC line voltages. In this case, the placement of the primary winding tap and the magnitudes of the intermediate and secondary voltages are the interrelated variables that are adjusted to achieve an exemplary optimization of model 200. In other situations with a different configuration, there may be different variables to process for the desired optimization without departing from the present invention.

FIG. 3 illustrates a control process 300 for configuring the operational mode of model 200 (for an exemplary dual line voltage charger) by adjusting the "boost" of boost stage 220 and setting the state of relay 250 responsive to the actual line voltage. Process 300 begins at step 305 and measures the AC line input voltage to determine which of the two input charging voltages are available. At step 310, process 300 determines whether the charging voltage is a first voltage (e.g., 240 Vac) or a second voltage (e.g., 120 Vac). When the available charging voltage is 240 Vac, process 300 performs steps 315 and 320 before step 325, while process 300 performs steps 330 and 335 before step 325 when the available charging voltage is 120 Vac.

Step 315 sets a first scaling factor to use in the isolation-buck stage when converting the intermediate voltage to the secondary voltage. Step 320 operates the boost stage to convert the 240 Vac to the desired intermediate voltage using the "normal" boost. For example, step 320 boosts the 240 Vac to ~400 Vdc as the intermediate voltage.

Step 330 sets a second scaling factor to use in the isolation-buck stage when converting the intermediate voltage to the secondary voltage. Step 335 operates the boost stage to convert the 120 Vac to the desired intermediate voltage using the "modified" boost. For example, step 335 will boost the 120 Vac to less than the ~400 Vdc and use the reduced voltage as the intermediate voltage.

Step 325 scales the intermediate voltage from step 320 or step 335 by applying the appropriate scaling factor from step 315 or step 330 to produce the desired secondary voltage.

Process 300 (at step 340) next converts the secondary voltage to the desired charging voltage and then, step 345, applies the charging voltage to the ESS.

Figure 4:
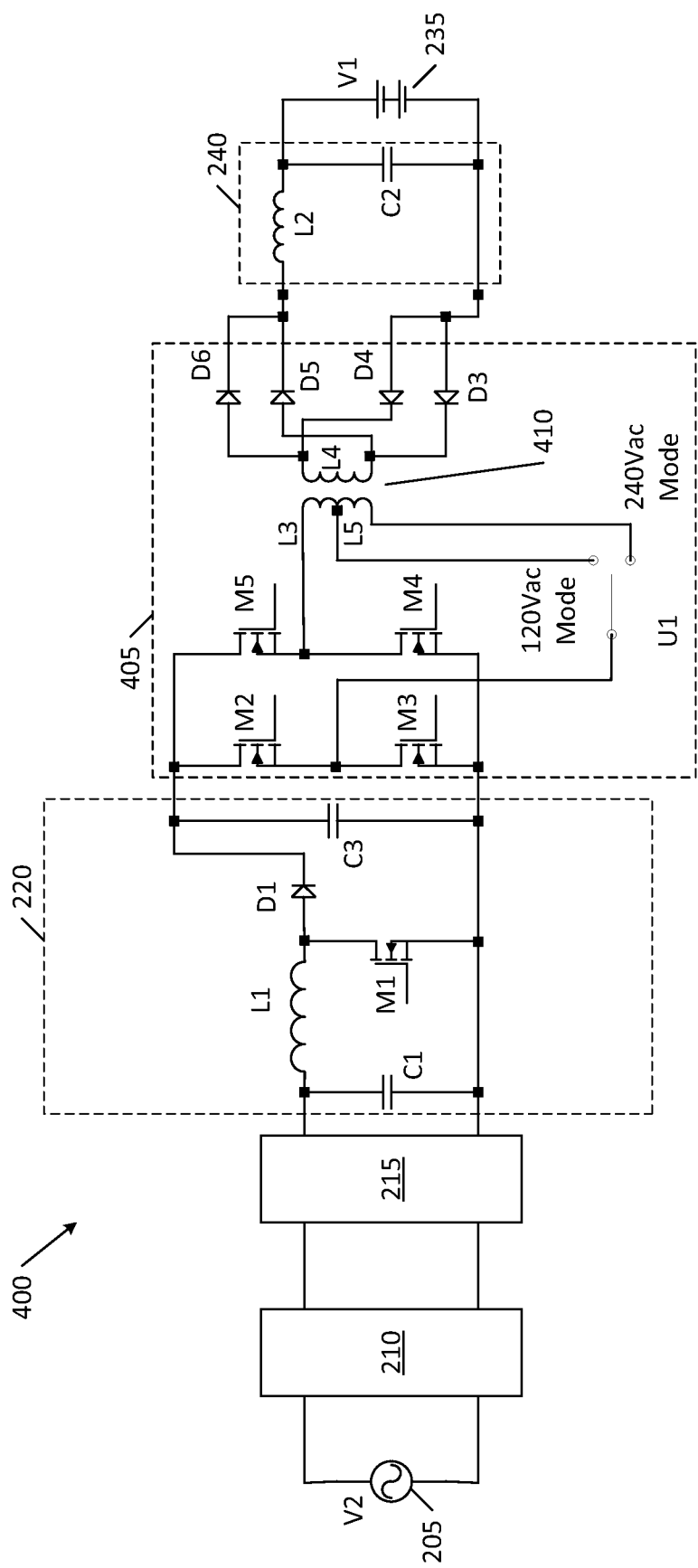
FIG. 4 illustrates a more detailed charging model for energy the converter when used for charging the energy storage system.

FIG. 4 illustrates a more detailed charging model 400 for energy converter 115 used for charging. Representative components for an exemplary charging configuration are included for model 400. Boost stage 220 is shown including a boost inductor L1, NMOS switch M1, a diode D1 and capacitor C3. There is shown the isolation stage as circuit 405 which includes the isolation transformer (L3, L4, and L5) and buck components. Other configurations for a boost stage are possible, of course.

Boost stage 220 provides the power factor correction (PFC) front-end that is required of all commercial charging systems. By varying operation of transistor M1, boost stage 220 sets the boost level of input voltage V2 when producing the appropriate intermediate voltage across C3. Isolation stage 405 isolates ESS 235 from AC line voltage source 205, removes any common mode currents that would be present but-for the isolation, and includes a buck stage to convert the secondary voltage to a charging voltage applied to ESS 235.

Isolation stage 405 includes an isolation transformer 410 with a tap on the primary winding, dividing the primary winding into a pair of inductors: L3 and L5. The secondary winding is shown as L4. Relay U1 applies the intermediate voltage from boost stage 220 to the entire primary winding (L3+L5) when V2 is 240 Vac (shown as the "240 Vac mode") and applies the intermediate voltage to a portion of the primary winding (L3) when V2 is 120 Vac (shown as the "140 Vac mode").

For 240 Vac, producing an intermediate voltage of about 400 Vdc provides a charging efficiency of about 96% for boost stage 220 and a charging efficiency of about 97% for isolated buck stage 405, then the total overall charging efficiency is about 93%. Absent the present invention, the 120 Vac would be boosted to the same level (~400 Vdc) resulting in about an 88% efficiency for boost stage 220, and an overall efficiency of about 85%.

By boosting the intermediate voltage to about 225 Vdc instead, boost stage 220 operates at about 93% charging efficiency, having an overall efficiency of about 90%. Because of the relatively large amounts of energy used in charging ESS 235, what may appear to be relatively minor improvements in charging efficiency are very important, thus the improvement enabled by the present invention is quite significant.

The system and methods above has been described in general terms as an aid to understanding details of preferred embodiments of the present invention. Other preferred embodiments of the present include the described application for improving charging efficiency. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Variations of the preferred embodiment include the use of different or additional input voltages, multiple taps on the primary winding, one or more taps on the secondary winding (including moving U1 to the secondary side or adding a new relay) and/or a variable transformer. Taps on the primary winding permit different positive scaling factors (increasing the intermediate voltage when producing the secondary voltage). A tap on the secondary winding permits use of a "negative" scaling factor (less than a ratio of 1) for an implementation that reduces the intermediate voltage when converting it to the secondary voltage. One or more taps on both the primary and secondary permits scenarios that include both positive and negative scaling factors. Multiple taps provide more scaling factors and thus a finer control for matching a "most" efficient boost level from the boost stage more closely to the desired secondary voltage. Any improvement in the charging efficiency in these variations is, in the context of an EV, measured by the attendant increase in cost, reliability, and size and it may not always be desired to obtain a theoretical "most optimum" charging efficiency as first order optimizations based upon a single tap, a relay, and a selectively lower intermediate voltage as described herein may be best in some implementations.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus for charging an energy storage system (ESS) from an AC line having one of a first AC RMS line voltage and a second AC RMS line voltage greater than the first AC RMS line voltage, comprising:
    a boost stage converting the first or second AC RMS line voltage to an intermediate voltage greater than a peak voltage of the first or second AC RMS AC RMS line voltage, wherein said intermediate voltage is responsive to a boost control signal to set a magnitude of said intermediate voltage, wherein said intermediate voltage has one of a first intermediate magnitude and a second intermediate magnitude greater than said first intermediate magnitude;
    an isolation buck stage both converting said intermediate voltage to a secondary voltage and converting said secondary voltage to a charging voltage applied to the ESS, with said charging voltage greater than a charge voltage of the ESS, said isolation buck stage removing a common mode current between the ESS and said boost stage, said isolation buck stage including a first operational mode and a second operational mode, said operational modes responsive to an isolation control signal, wherein said operational modes scale said conversion of said intermediate voltage to said secondary voltage with said first operational mode providing a first scaling of said intermediate voltage different from a second scaling of said second operational mode; and
    a controller, coupled to said stages and providing said control signals responsive to a magnitude of the first or second AC RMS line voltage, wherein said boost stage produces said first intermediate magnitude from the first AC RMS line voltage and said isolation buck stage is configured for said first operational mode to convert said first intermediate voltage to said secondary voltage, and wherein said boost stage produces said second intermediate magnitude from the second AC RMS line voltage and said isolation buck stage is configured for said second operational mode to convert said second intermediate voltage to said secondary voltage.

2. The apparatus of claim 1 wherein said isolation buck stage includes an isolation transformer for scaling said intermediate voltage to said secondary voltage by applying said intermediate voltage to a primary winding of said isolation transformer and obtaining said secondary voltage from a secondary winding of said isolation transformer.

3. The apparatus of claim 2 wherein said first operational mode includes applying said first intermediate voltage to a number N turns of said primary winding, wherein said second operational mode includes applying said second intermediate voltage to a number M turns of said primary winding, and wherein M is different than N.

4. The apparatus of claim 3 wherein the first AC RMS voltage is nominally 120 Vrms and wherein the second AC RMS voltage is nominally 240 Vrms.

5. The apparatus of claim 4 wherein a charging efficiency is responsive to both a difference between a magnitude of the line voltage and said intermediate voltage and a difference between said intermediate voltage and said secondary voltage and wherein said intermediate voltages, said number N, and said number M provide said charging efficiency at a value greater than about 90% for both of the AC RMS voltages.

6. The apparatus of claim 1 wherein a charging efficiency is responsive to both a difference between a magnitude of the line voltage and said intermediate voltage and a difference between said intermediate voltage and said secondary voltage and wherein said intermediate voltages and said scaling provide said charging efficiency at a value greater than about 90% for both of the AC RMS voltages.

7. The apparatus of claim 1 wherein said first scaling is greater than said second scaling with said secondary voltage greater than said intermediate voltages.

8. A method for charging an energy storage system (ESS) from an AC line voltage having one of a first AC RMS line voltage and a second AC RMS line voltage greater than the first AC RMS line voltage, the method comprising the steps of:
  a) determining which of the first and second AC line voltages are available for charging the ESS as a charging AC voltage;
  b) boosting said charging AC voltage to an intermediate voltage, the intermediate voltage having a first intermediate magnitude when produced from the first AC line voltage and a second intermediate magnitude when produced from the second AC line voltage, said first intermediate magnitude less than said second intermediate magnitude than when said particular one of the first and second AC line voltages is the second AC RMS line voltage;
  c) scaling, responsive to said particular one of the first and second AC line voltages, said intermediate voltage to a secondary voltage using a scaling factor, said scaling factor different when said particular one of the first and second AC line voltages is the first AC RMS line voltage than when said particular one of the first and second AC line voltages is the second AC RMS line voltage; and
  d) converting said secondary voltage to a charging voltage applied to the ESS.

9. The method of claim 8 wherein said scaling step c) includes applying said intermediate voltage to a primary winding of an isolation transformer and receiving said secondary voltage from a secondary winding of said isolation transformer.

10. The method of claim 9 wherein said scaling factor is responsive to a ratio of an effective number of turns of said primary winding to a number of turns of said secondary winding wherein said effective number of turns of said primary winding when said particular one AC line voltage is the first AC RMS line voltage is different from said effective number of turns of said primary winding when said particular one AC line voltage is the second AC RMS line voltage.

11. The method of claim 8 wherein a charging efficiency is responsive to both a difference between a magnitude of the line voltage and said intermediate voltage and a difference between said intermediate voltage and said secondary voltage and wherein said boosting step b) and said scaling step c) set said intermediate voltages and said scaling factor to provide said charging efficiency at a value greater than about 90% for both of the AC RMS voltages.

* * * * *